United States Patent
Hokao

(10) Patent No.: US 7,027,419 B1
(45) Date of Patent: Apr. 11, 2006

(54) TRANSMITTING AND RECEIVING CIRCUIT, MOBILE COMMUNICATION TERMINAL DEVICE EMPLOYING THE SAME AND CONTROL METHOD THEREFOR

(75) Inventor: Tomoaki Hokao, Tokyo (JP)

(73) Assignee: NEC Corporation, Tokyo (JP)

( * ) Notice: Subject to any disclaimer, the term of this patent is extended or adjusted under 35 U.S.C. 154(b) by 694 days.

(21) Appl. No.: 09/656,715

(22) Filed: Sep. 7, 2000

(30) Foreign Application Priority Data

Sep. 14, 1999 (JP) .................................. 11-259675

(51) Int. Cl.
*H04B 7/216* (2006.01)

(52) U.S. Cl. ....................................... 370/335; 370/342

(58) Field of Classification Search ................ 375/140, 375/141, 142, 143, 146, 147, 150, 152; 370/310, 370/328, 329, 335, 342
See application file for complete search history.

(56) References Cited

U.S. PATENT DOCUMENTS

| | | | |
|---|---|---|---|
| 5,235,615 A * | 8/1993 | Omura ........................ 370/342 |
| 5,596,571 A | 1/1997 | Gould et al. | |
| 6,263,010 B1 * | 7/2001 | Naruse et al. .............. 375/130 |
| 6,266,364 B1 * | 7/2001 | Ishida ........................ 375/142 |
| 6,590,886 B1 * | 7/2003 | Easton et al. ............... 370/342 |

FOREIGN PATENT DOCUMENTS

| | | |
|---|---|---|
| EP | 0 744 840 A2 * | 11/1996 |
| GB | 2 323 749 A | 9/1998 |
| JP | 8-321804 A | 12/1996 |
| JP | 10-336749 | 12/1998 |

* cited by examiner

*Primary Examiner*—Ricky Ngo
*Assistant Examiner*—Derrick W Ferris
(74) *Attorney, Agent, or Firm*—Sughrue Mion, PLLC

(57) ABSTRACT

A transmitting and receiving circuit, a mobile communication terminal device using the same, a control method and a storage medium storing a control program permit interruption of operation of associated functions including a code generator in a time zone where transmission or reception is not performed in discontinuous transmission operation, whereby to prevent wasteful power consumption, and which can be realized with simple construction. The circuit of a mobile communication terminal device of CDMA system has code generating means for generating a multi-bit code necessary for transmission and reception, storing means for storing value of each bit of the code generating means, and control means for writing value of each bit at an arbitrary timing of the code generating means, reading the value of each bit stored in the storage means at an arbitrary timing and setting to each corresponding bit of the code generating means.

3 Claims, 8 Drawing Sheets

TRANSMITTING AND RECEIVING CIRCUIT, MOBILE COMMUNICATION TERMINAL DEVICE EMPLOYING THE SAME AND CONTROL METHOD THEREFOR

BACKGROUND OF THE INVENTION

1. Field of the Invention

The present invention relates generally to a transmitting and receiving circuit, a mobile communication terminal device employing the same and a control method therefor. More particularly, the invention relates to an improvement of generation method of spread or despread code in a transmitting and receiving circuit of a CDMA (Code Division Multi Access) type mobile communication terminal device.

2. Description of the Related Art

In a transmitting and receiving portion of a CDMA system, codes are generated for spreading and despreading required for processing a transmission and reception data. Typically, these codes are chip rate signals having certain constant periods. In the conventional system, when physical channels (kind of channel, code number and so forth) to be transmitted and received to and from the transmitting and receiving portion are assigned, code generators of shift register construction are constantly operated to continuously output codes necessary for transmission and reception.

In such system, upon performing discontinuous transmitting and receiving operation, such as a TDD (Time Division Duplex) mode, a DTX control (Discontinuous Transmission) control, a packet transmission and so forth, in CDMA system, for example, the code generators have to continue operation even in a time zone where transmission and reception are not performed to waste extra current.

Therefore, a technology for preventing wasteful power consumption has been disclosed in Japanese Unexamined Patent Publication No. Heisei 10-336749. FIGS. 8A, 8B and 8C are illustration for explaining the technology disclosed in the above-identified publication. Referring to FIG. 8A, a reception signal from an antenna 111 is amplified by an amplifier 112 and is frequency-converted by a local signal in a frequency converter 113. A frequency converted output is converted into a digital signal by an AD converter 114. Furthermore, the digital signal is despreaded with a spread code from a spread code generator 116 by a despreader 115. A despreaded output is subject to signal processing by a signal processor 117 to be supplied to a terminal device (not shown), such as a speaker, personal computer (PC) through a terminal interface portion 118.

As shown in FIG. 8B for example, the spread code generator 116 outputs a spread code from a final stage Se of a shift register 121, and in conjunction therewith, an exclusive OR of the spread code output from the final stage Se and an output of an intermediate shift stage is taken by an exclusive OR circuit 122. The output of the exclusive OR circuit 122 is fed back to the initial stage Si. As initial values, a register value which is not all "0" is input to each shift stage, and then is shifted toward the final stage Se per one stage at every occurrence of a shift clock. Every time of shifting, a value of the shift register 121 is updated.

Only radio channel determined by the spread code is output to the terminal interface portion 118. It is thus required to despread the received signal with the spread code synchronized with the spread code on the transmitter side. The spread code generator 116 is synchronized with the spread code of the reception signal by a not shown synchronization means. Furthermore, synchronization has to be maintained constantly. Upon performing intermittent reception, it should be desirable to stop the spread code generator 116 while receiving operation is no performed, in viewpoint of power consumption. However, in viewpoint of maintaining of synchronization with the spread code on the transmitter side, as shown in FIG. 8(C), a function 123 to read out a register value (condition) of the shift register 121 from time to time is provided to calculate the register value to be updated depending upon a period, in which receiving operation is not performed, on the basis of the read out register by a register value calculating function 124. The register value to be updated which is calculated as set forth above, can be set in the shift register 121 by a register value setting function 125.

Next, operation will be discussed. At first, the register is placed in operating condition and the receiver circuit is also placed in operating condition. Subsequently, upon occurrence of shift clock, the shift register 121 is shifted for one bit. Then, check is made whether a time to turn OFF the receiver circuit is reached or not. If the time is nor reached, the shift register 121 is further shifted for one bit in response to the shift clock. Thereafter, check is again made whether the time to turn OFF the receiver circuit is reached or not. Upon reaching the OFF time, the register value of the shift register 121 is read out by the register value reading out function 123 to feed to the register value calculating function 124.

In the regiser value calculating function 124, the register value (updating condition) upon updating of the condition, which will be obtained when the shift register 121 is shifted during OFF condition of the receiver circuit, is calculated. The updated register value is set in the register 121 by the setting function 125. Subsequently, operation of the register 121 is terminated, and the operation of the receiver circuit is terminated. It should be noted that the register value of the shift register 121 is held in the updated register value set in advance.

In this condition, a time at which the receiver circuit is turned ON next is waited. Upon reaching the ON time, the operation shifts to the first step and the operation set forth above is resumed. Namely, operation can be resumed with the register value the same as that when the operation is continued without interrupting operation of the shift register 121. Accordingly, synchronization with the spread code on the transmitter side can be maintained.

In the technology disclosed in Japanese Unexamined Patent Publication No. Heisei 10-336749, as illustrated in FIG. 8, as set forth above, upon interruption of operation or upon resumption of operation of the shift register 121 forming the code generator 116 for generating code, the updating condition of the register is calculated depending upon the period held inoperative by the register value calculating function 124 to set the result of calculation in the shift register 121. Therefore, a timer for measuring the period held inoperative condition, CPU (arithmetic device) for realizing the register value calculating function 124 are necessary. Then, such timer and CPU cannot interrupt operation even while the register is held inoperative. Therefore, restriction of power consumption cannot be satisfactory.

SUMMARY OF THE INVENTION

It is therefore an object of the present invention to provide a transmitting/a receiving circuit, a mobile communication terminal device using the same, a control method and a storage medium storing a control program, which permit interruption of operation of associated functions including a code generator in a time zone where transmission/reception is not performed in discontinuous transmission/reception operation, whereby to prevent wasteful power consumption, and which can be realized with simple construction.

According to the first aspect of the present invention, transmission circuit of a mobile communication terminal device of CDMA system comprises:
code generating means for generating a multi-bit code necessary for transmission;
storing means for storing value of each bit of the code generating means; and
control means for writing value of each bit at an arbitrary timing of the code generating means, and reading the value of each bit stored in the storage means at an arbitrary timing to set to each corresponding bit of the code generating means.

In the preferred construction, a control means may comprise:
means for performing a process of transmission data with a code by continuously operating the code generating means at an initial code period after initiation of transmitting operation or modification of a transmission code, and writing a value of each bit of the code generating means in the storage means at a timing of leading end of each discontinuous transmission unit period which is shorter than a code period, in the code period;
means for reading a bit string corresponding to discontinuous transmission unit period stored in the storage means at a timing of leading end of discontinuous transmission unit period in second and subsequent code period to perform transmission and perform process of transmission data with the generation code with performing code generating operation after setting the bit string in respectively corresponding bit of the code generating means; and
means for interrupting operation of the code generating means in the discontinuous transmission unit period not performing transmission.

The control means may control the code generating means to operate only in a time zone performing transmission and to interrupt the operation in a time zone not performing transmission, in discontinuous transmission.

According to the second aspect of the present invention, a reception circuit of a mobile communication terminal device of CDMA system comprises:
code generating means for generating a multi-bit code necessary for reception;
storing means for storing value of each bit of the code generating means; and
control means for writing value of each bit at an arbitrary timing of the code generating means, and reading the value of each bit stored in the storage means at an arbitrary timing to set to each corresponding bit of the code generating means.

In the reception circuit set forth above, the control means may comprise:
means for performing a process of reception data with a code by continuously operating the code generating means at an initial code period after initiation of receiving operation or modification of a reception code, and writing a value of each bit of the code generating means in the storage means at a timing of leading end of each discontinuous reception unit period which is shorter than a code period, in the code period;
means for reading a bit string corresponding to discontinuous reception unit period stored in the storage means at a timing of leading end of discontinuous reception unit period in second and subsequent code period to perform reception and perform process of reception data with the generation code with performing code generating operation after setting the bit string in respectively corresponding bit of the code generating means; and
means for interrupting operation of the code generating means in the discontinuous reception unit period not performing reception.

The control means may control the code generating means to operate only in a time zone performing reception and to interrupt the operation in a time zone not performing reception, in discontinuous reception.

According to the third aspect of the present invention mobile communication terminal device comprising:
a transmission circuit constructed according to the foregoing first aspect of the present invention; and
a reception circuit constructed according to the foregoing second aspect of the present invention. The code generating means may be used in common in the transmission circuit and the reception circuit.

The mobile communication terminal device may comprise:
a common shift register portion constituted of shift register having smaller bit number among registers forming respective code generating means of the transmission circuit and reception circuit;
a remaining shift register portion constituted of remaining shift register having greater bit number among registers forming respective code generating means of the transmission circuit and reception circuit;
exclusive OR means and shift register tap for transmission and reception for generating respective of the codes necessary for transmission and reception;
switching means for switching respective outputs of the exclusive OR means, an output of the common shift register portion and an output of remaining shift register portion depending upon transmission and reception.

According to the fourth aspect of the present invention, a mobile communication terminal device in a CDMA system designed for interrupting transmitting operation in a discontinuous reception unit period in a discontinuous transmission, and for interrupting receiving operation in discontinuous transmission unit period, comprises:
a common shift register portion constituted of shift register having smaller bit number among registers forming respective code generating means of the transmission circuit and reception circuit;
a remaining shift register portion constituted of remaining shift register having greater bit number among registers forming respective code generating means of the transmission circuit and reception circuit;
exclusive OR means and shift register tap for transmission and reception for generating respective of the codes necessary for transmission and reception;
switching means for switching respective outputs of the exclusive OR means, an output of the common shift register portion and an output of remaining shift register portion depending upon transmission and reception.

According to the fifth aspect of the present invention, a transmission control method for a mobile communication terminal device in CDMA system having code generating means generating a multi-bit code necessary for transmission comprises:
    a writing step of switching each bit of the code generating means at an arbitrary timing in a storage means; and
    a reading step of reading out value of each bit stored in the storage means at an arbitrary timing and setting in each corresponding bit of the code generating means.

In the transmission control method, the writing step may comprise:
    step of performing a process of transmission data with a code by continuously operating the code generating means at an initial code period after initiation of transmitting operation or modification of a transmission code, and writing a value of each bit of the code generating means in the storage means at a timing of leading end of each discontinuous transmission unit period which is shorter than a code period, in the code period;
    the reading step may comprise:
    step of reading a bit string corresponding to discontinuous transmission unit period stored in the storage means at a timing of leading end of discontinuous transmission unit period in second and subsequent code period to perform transmission and setting the bit string in respectively corresponding bit of the code generating means;
    the transmission control method may further comprise:
    step of processing transmission data with the generation code with performing code generating operation after setting the bit string in respectively corresponding bit of the code generating means; and
    step of interrupting operation of the code generating means in the discontinuous transmission unit period not performing transmission.

The code generating means only may be operated only in a time zone performing transmission and interrupt the code generating means in a time zone not performing transmission, in discontinuous transmission.

According to the sixth aspect of the present invention, a reception control method for a mobile communication terminal device in CDMA system having code generating means generating a multi-bit code necessary for reception comprises:
    a writing step of switching each bit of the code generating means at an arbitrary timing in a storage means; and
    a reading step of reading out value of each bit stored in the storage means at an arbitrary timing and setting in each corresponding bit of the code generating means.

In the reception control method, the writing step may comprise:
    step of performing a process of reception data with a code by continuously operating the code generating means at an initial code period after initiation of transmitting operation or modification of a reception code, and writing a value of each bit of the code generating means in the storage means at a timing of leading end of each discontinuous reception unit period which is shorter than a code period, in the code period;
    the seading step may comprise:
    step of reading a bit string corresponding to discontinuous reception unit period stored in the storage means at a timing of leading end of discontinuous reception unit period in second and subsequent code period to perform reception and setting the bit string in respectively corresponding bit of the code generating means;
    the reception control method may further comprise:
    step of processing reception data with the generation code with performing code generating operation after setting the bit string in respectively corresponding bit of the code generating means; and
    step of interrupting operation of the code generating means in the discontinuous reception unit period not performing reception.

The code generating means only may be operated only in a time zone performing reception and interrupt the code generating means in a time zone not performing reception, in discontinuous reception.

According to the seventh aspect of the present invention, a storage medium storing a control program of a transmission control method of a mobile communication terminal device in CDMA system having code generating means for generating multi-bit code necessary for transmission,
    the program comprises:
    a writing step of switching each bit of the code generating means in storage means at an arbitrary timing; and
    a reading step of reading value of each bit stored in the storage means at an arbitrary timing to set in each corresponding bit of the code generating means.

The writing step may comprise:
    step of performing a process of transmission data with a code by continuously operating the code generating means at an initial code period after initiation of transmitting operation or modification of a transmission code, and writing a value of each bit of the code generating means in the storage means at a timing of leading end of each discontinuous transmission unit period which is shorter than a code period, in the code period;
    the reading step may comprise:
    step of reading a bit string corresponding to discontinuous transmission unit period stored in the storage means at a timing of leading end of discontinuous transmission unit period in second and subsequent code period to perform transmission and setting the bit string in respectively corresponding bit of the code generating means;
    the program may further comprise:
    step of processing transmission data with the generation code with performing code generating operation after setting the bit string in respectively corresponding bit of the code generating means; and
    step of interrupting operation of the code generating means in the discontinuous transmission unit period not performing transmission.

According to the eighth aspect of the present invention, a storage medium storing a control program of a reception control method of a mobile communication terminal device in CDMA system having code generating means for generating multi-bit code necessary for reception,
    the program may comprise:
    a writing step of switching each bit of the code generating means in storage means at an arbitrary timing; and
    a reading step of reading value of each bit stored in the storage means at an arbitrary timing to set in each corresponding bit of the code generating means.

The writing step may comprise:
    step of performing a process of reception data with a code by continuously operating the code generating means at an initial code period after initiation of transmitting operation or modification of a reception code, and writing a value of each bit of the code generating means in the storage means at a timing of leading end of each discontinuous reception unit period which is shorter than a code period, in the code period;

the reading step may comprise:

step of reading a bit string corresponding to discontinuous reception unit period stored in the storage means at a timing of leading end of discontinuous reception unit period in second and subsequent code period to perform reception and setting the bit string in respectively corresponding bit of the code generating means;

the program may further comprise:

step of processing reception data with the generation code with performing code generating operation after setting the bit string in respectively corresponding bit of the code generating means; and step of interrupting operation of the code generating means in the discontinuous reception unit period not performing reception.

In the present invention constructed as set forth above, the code generated by the code generator of shift register construction is considered by dividing into a period shorter than one period of the generated code, more particularly into a unit period performing discontinuous transmission. Hereinafter, a period corresponding to one period of the code will be referred to as "code period" and a unit period performing discontinuous transmission will be referred to as "discontinuous transmission unit period". The discontinuous transmission unit period is shorter than or equal to the code period. For example, in TDD mode, discontinuous transmission is performed per slot period (<code period). The code is considered dividing per slot period.

In the transmitting portion, process of transmition data is performed with a code by continuously operating the code generating means at an initial code period after initiation of receiving operation or modification of a reception code. At this time, a value of each bit of the code generating means is written in the storage means at a timing of leading end of each discontinuous transmission unit period.

Subsequently, each bit corresponding to discontinuous transmission unit period stored in the storage means is read out at a timing of leading end of discontinuous transmission period in second and subsequent code period to be set in the code generating means and to be shifted. And process of transmission data is performed with the generation code. In the discontinuous transmission unit period not performed the transmission operation, the code generating means is interrupted. In the reception portion, the operation is performed similar to be the transmission set foth above.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

Figure 1:
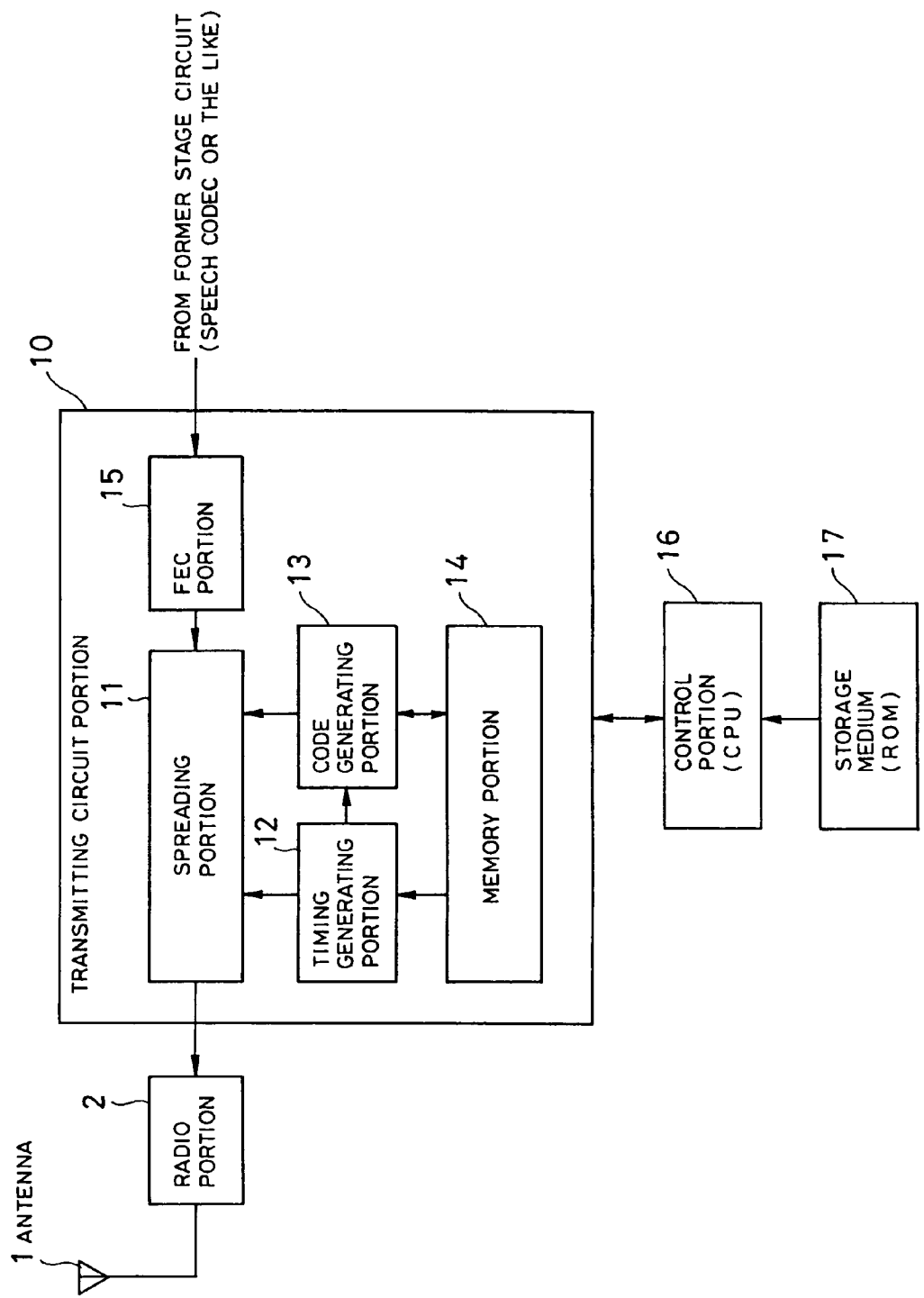
FIG. 1 is an illustration showing a construction of a transmitting portion of the present invention.

FIG. 1 is a block diagram showing an overall construction of a transmitting circuit portion of the present invention. Referring to FIG. 1, an antenna 1 and a radio portion 2 performs transmission and reception of data. A transmitting circuit portion 10 performs spread coding process of transmission data from a not shown voice coding portion or the like to supply to the radio portion 2.

The transmitting circuit portion 10 is constructed with a spread portion 11, a timing generating portion 12, a code generating portion 13, a memory portion 14 and an FEC (Forward Error Correction) portion 15. The spread portion 11 has a function for performing process by a code of a transmission data, such as spreading process, scrambling process or the like. The timing generating portion 12 generates a timing signal necessary for process with the code or code generation.

The code generating portion 13 is a multi-bit shift register construction and adapted for generating necessary code. The memory portion 14 stores values of a code generation shift register at leading timings of each discontinuous transmission unit period. The FEC portion 15 performs data processing in advance of process of transmission data with the code. For instance, FEC portion 15 performs calculation of CRC (Cyclic Redundancy Code), error correction coding, interleaving process and so forth. The FEC portion 15 is not particularly relevant to the present invention, and the discussion therefor will be omitted.

Furthermore, a control portion 16 and a storage medium 17 are provided. The control portion 16 performs control of operation of the transmitting circuit portion 10, and more particularly to the timing generating portion 12, the code generating portion 13 and the memory portion 14. Typically, the control portion 16 is formed with CPU. In this case, CPU read out a program preliminarily stored in the storage medium 17 and performs control of operation of respective parts according to the program. As the storage medium, not only a non-volatile memory but also volatile memory may be used. On the other hand, a magnetic disk, an optical disk, a magneto-optic disk, flash memory and other storage medium may also be used.

Figure 2:
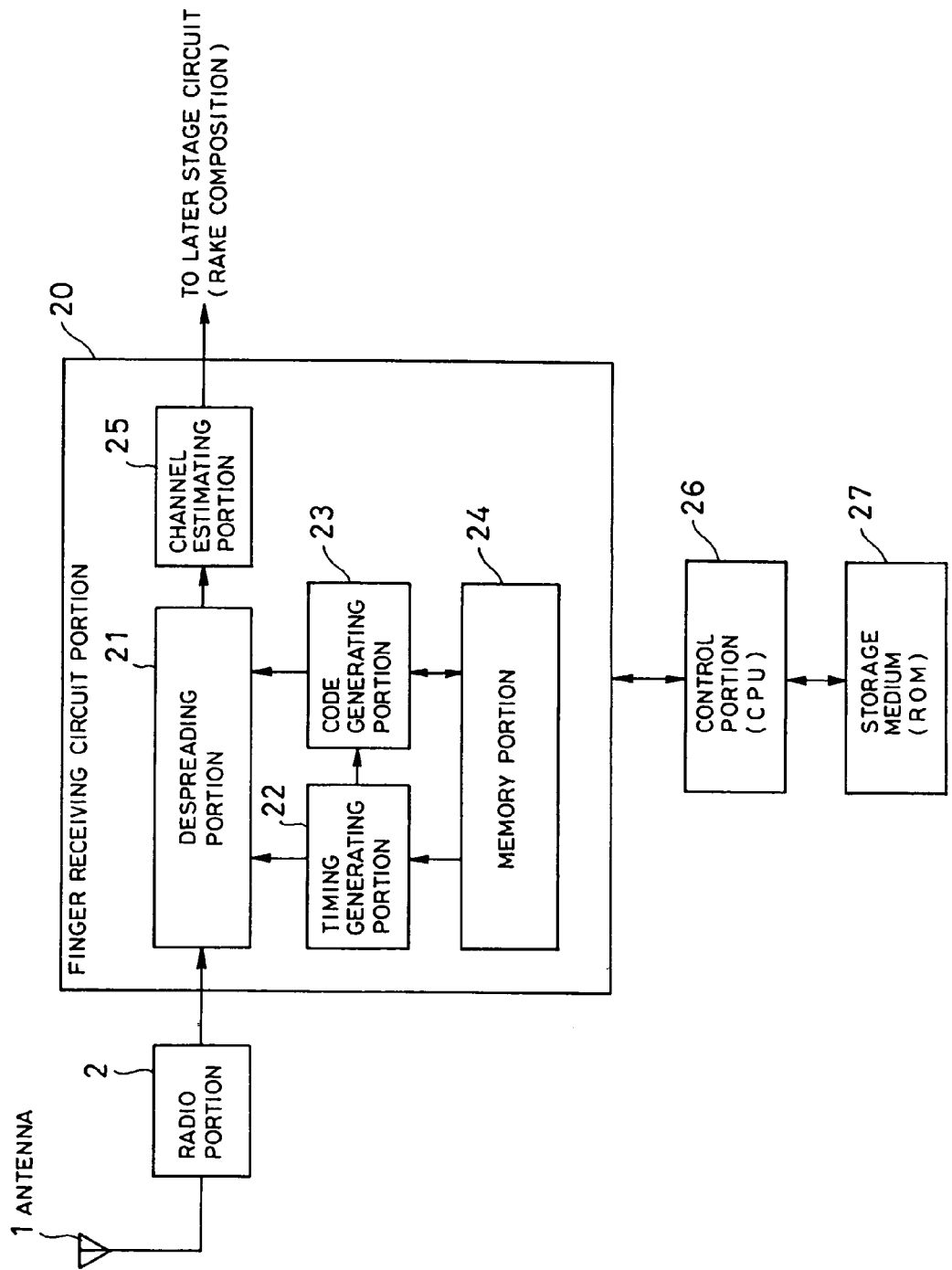
FIG. 2 is an illustration showing a construction of a receiving portion of the present invention.

Next, FIG. 2 is an illustration showing an overall construction of a receiving circuit portion of the present invention. In FIG. 2, the antenna and the radio portion 2 are used in common with the transmitting circuit portion 10 shown in FIG. 1. A receiving circuit portion 20 is a so-called finger receiver portion and includes a despreading portion 21, a timing generating portion 22, a code generating portion 23, a memory portion 24 and a channel estimating portion 25.

The despreading portion 21 performs process of a reception data with the code, such as despreading, for example. The timing generating portion 22 is designed for generating a timing signal necessary for process with the code and code generation. The code generating portion 23 is a shift register construction of a plurality of bits and is designed for generating the necessary code. The memory portion 24 stores the value of the shift register for code generation at a timing of leading end of each discontinuous transmission unit period. The channel estimating portion 25 performing process of the reception data after code processing to output the processed reception data to a not shown Rake composition circuit at the latter stage. The channel estimating portion 25 is not particularly relevant to the present invention and discussion therefore will be omitted.

Furthermore, a control portion 26 of CPU construction performing control operation of respective parts of the receiving circuit portion 20, and a storage medium 27 preliminarily storing operation procedure of the control portion in a form of program. The storage medium 27 is equivalent to the storage medium 17 of FIG. 1.

Figure 3:
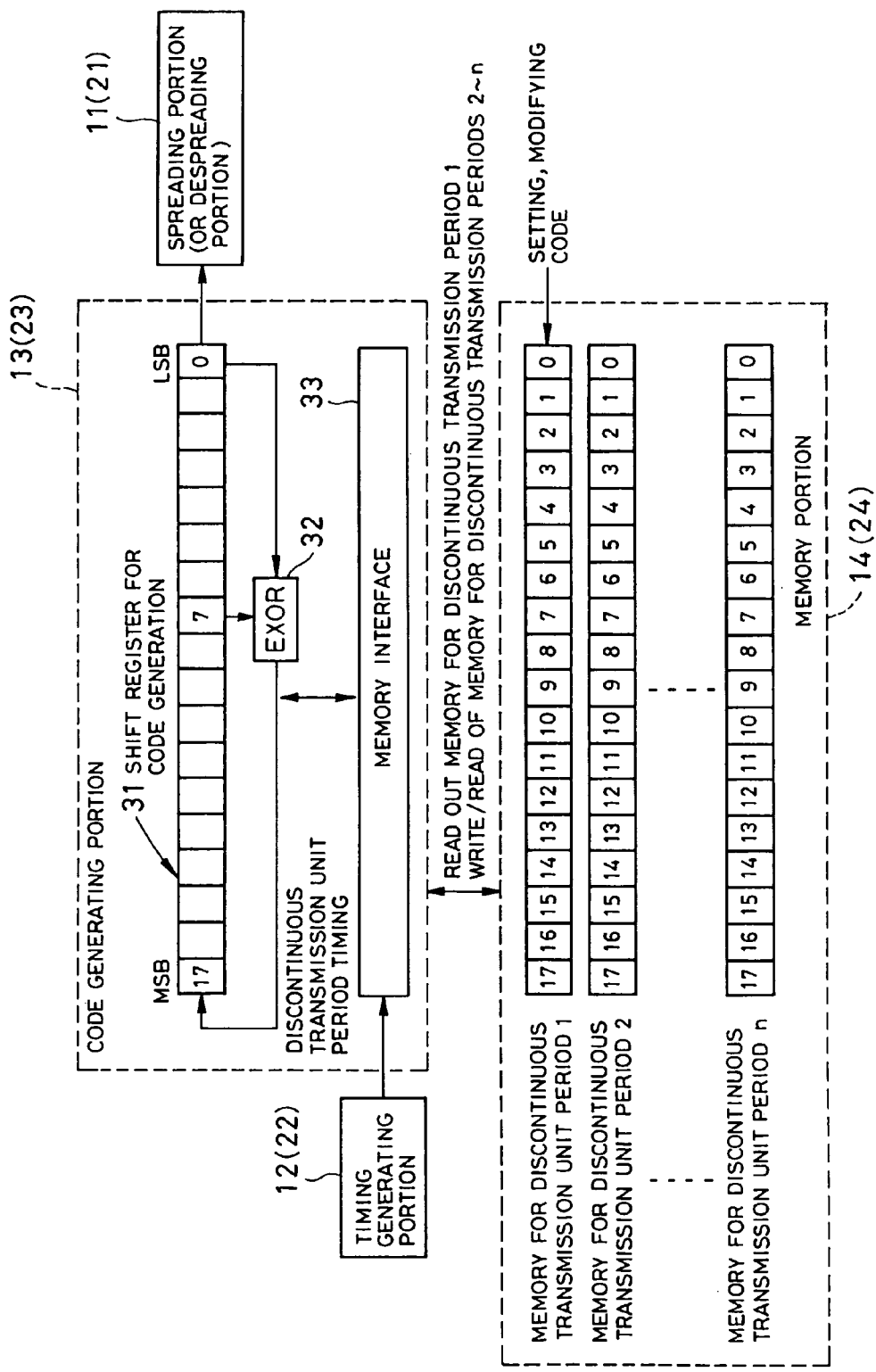
FIG. 3 is an illustration for explaining a detail of a code generating portion of the present invention.

FIG. 3 is a detailed illustration for explaining operation of the transmitting circuit portion 10 and the receiving circuit portion 20 shown in FIGS. 1 and 2. Since the transmitting circuit portion 10 and the receiving circuit portion 20 are the same function, these are illustrated in common in FIG. 3. Referring to FIG. 3, a shift register 31 for code generation generates a code necessary for transmission and reception to output to the spreading portion 11 or the despreading portion 21. FIG. 3 is illustrated in simplified form and the circuit to be practically used should be more complicate. Also, number of bits of the shift register 31 and a tap lead out position for code generation merely show examples thereof.

The shift register 31 for code generation is a shift register of 18 bit construction in the shown embodiment. An exclusive OR circuit 32 performs an exclusive OR operation of tap outputs of the first bit (least significant bit) and the eighth bit to input the output of the exclusive OR to the most significant bit (eighteenth bit). The generation code from the first bit (least significant bit) is output.

On the basis of an appropriate timing supplied from the timing generating potion 12 (or 22), a memory interface 33 reads out each bit value for the shift register from the memory portion 14 (or 24) to set in the shift register 31 for code generation. On the other hand, on the basis of an appropriate timing supplied from the timing generating portion 12 (or 22), each bit value of the shift register 31 for code generation is read out and write in the memory portion 14 (or 24).

In case of the transmitting circuit portion, the generation code is supplied to the spreading portion 11 to be used for processing of the transmission data. In case of the receiving circuit portion, the generation code is supplied to the despreading portion 21 to be used for processing of the reception data.

The memory portion 14 (or 24) stores each bit value of the shift register 31 for code generation at the timing of the leading end of the discontinuous transmission unit period. Number of memories n required becomes a value corresponding to number of discontinuous transmission unit periods presenting within one code period at the maximum, but, in practice, can be number of the of discontinuous transmission unit periods possibly perform data transmission. Bit number of the memory portion corresponds to bit number of the shift register 31 for code generation.

Figure 4:
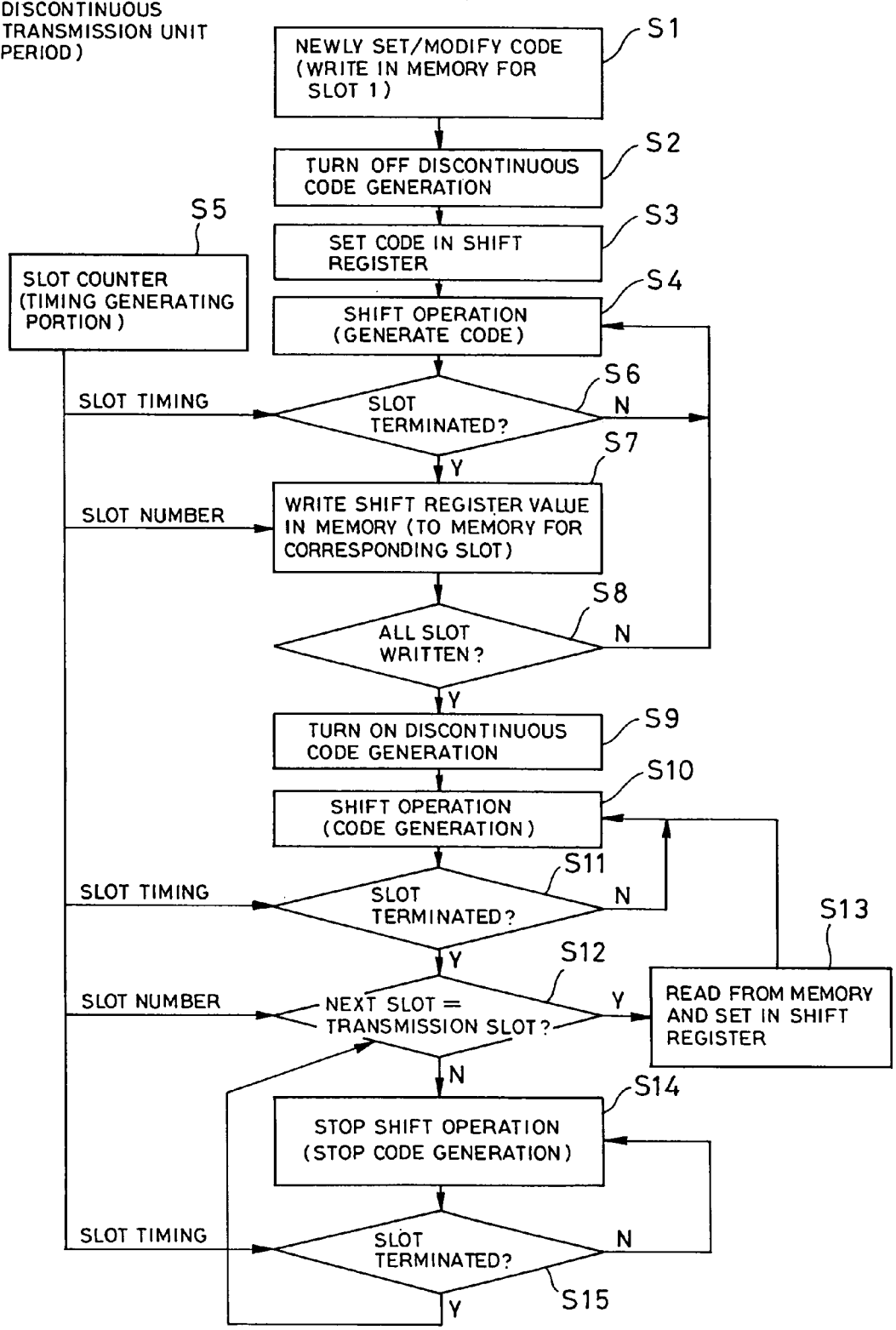
FIG. 4 is a flowchart showing an operation of the embodiment of the present invention.
Figure 5:
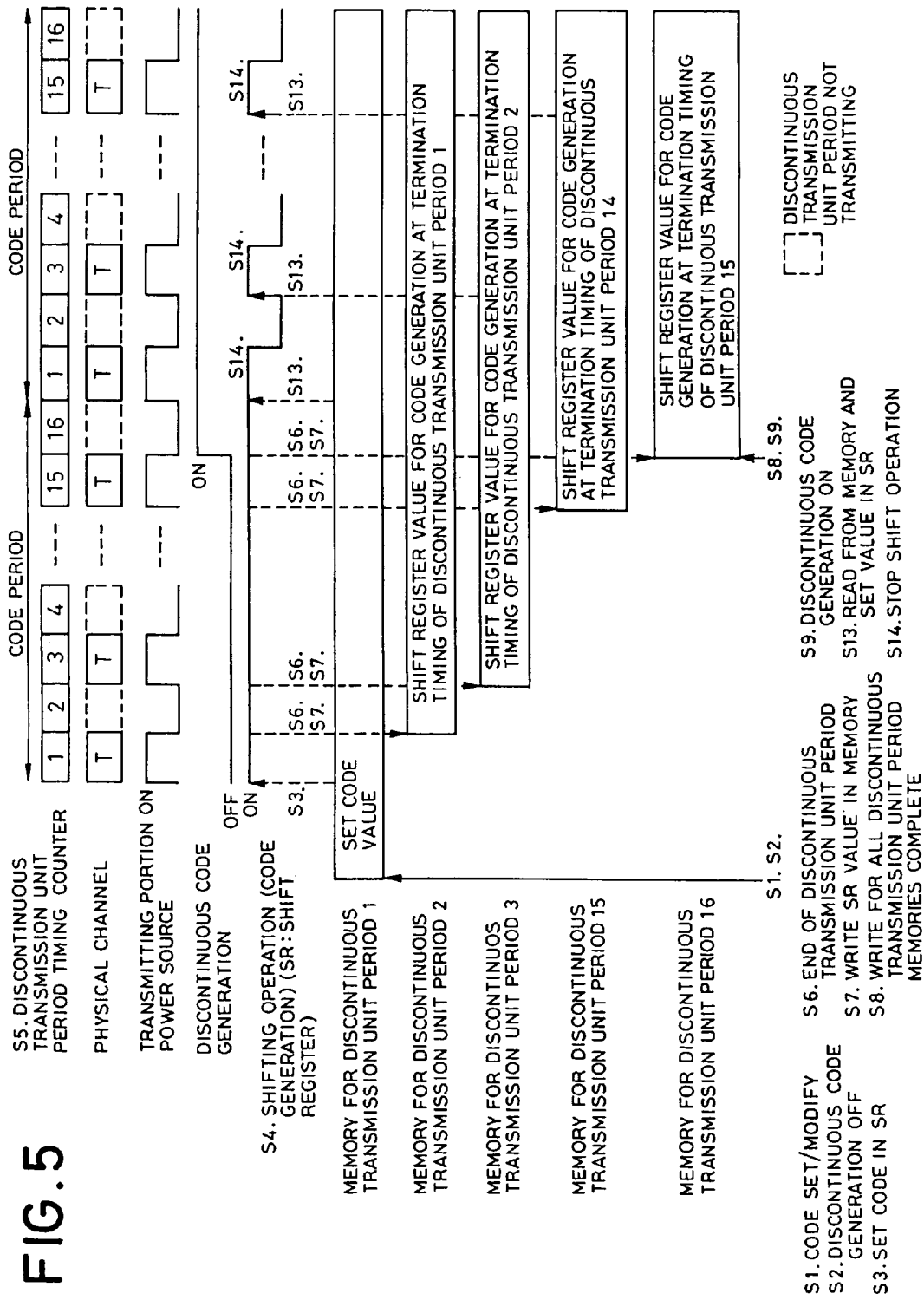
FIG. 5 is a timing chart showing operation upon transmission in the present invention.
Figure 6:
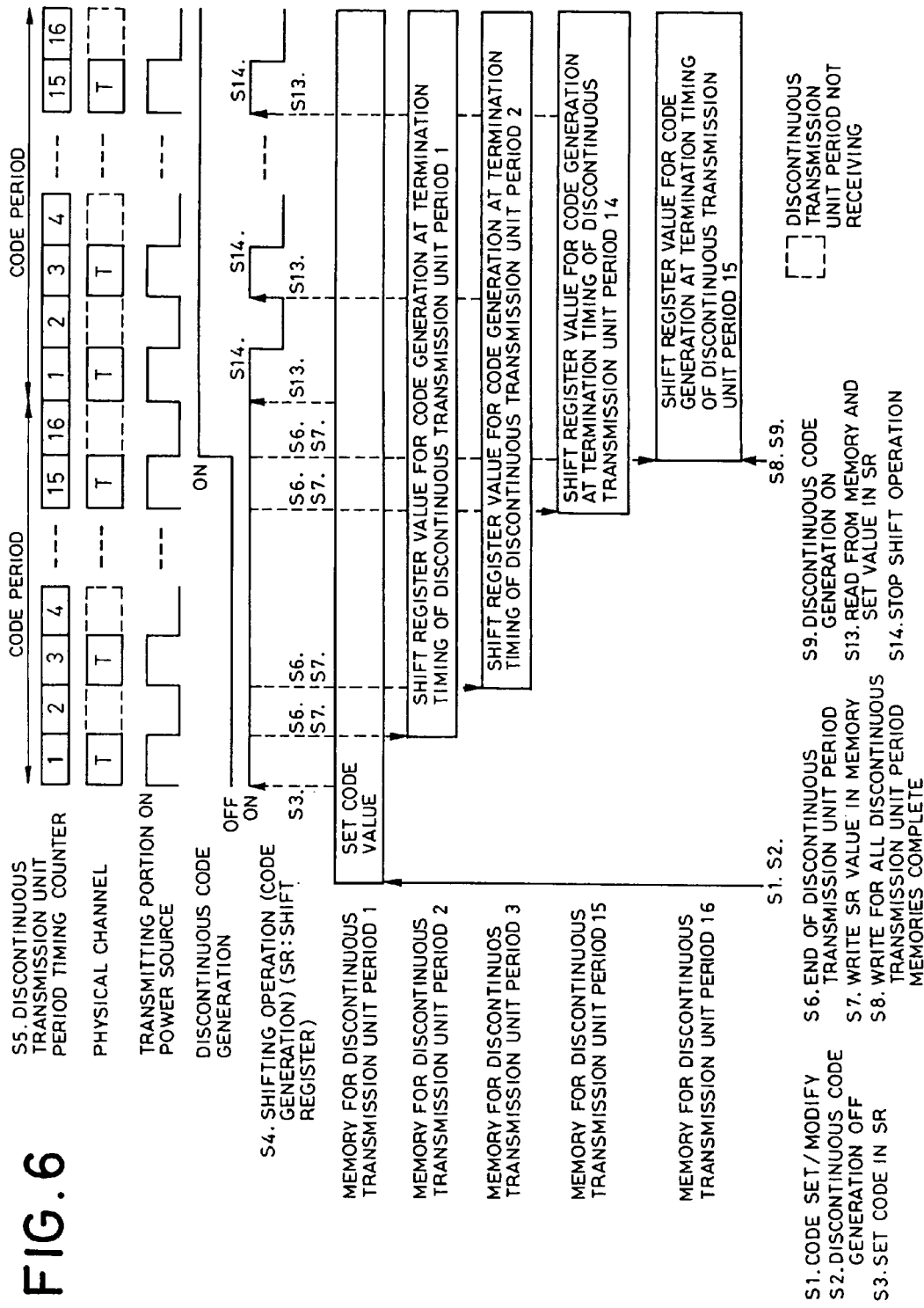
FIG. 6 is a timing chart showing operation upon reception in the present invention.

FIG. 4 is an operation flow (common in the transmitting circuit portion and the receiving circuit portion) of the present invention, FIG. 5 is an operation timing of the transmitting circuit portion, and FIG. 6 is an operation timing of the receiving circuit portion. FIGS. 5 and 6 show the case where sixteen unit periods of discontinuous transmission (discontinuous transmission unit periods) are present in one code period (period corresponding to one period of generation code by the code generating portion 13 (23)). Accordingly, in this case, sixteen memories are provided. The memory is not necessary for the unit period of discontinuous transmission (also called as slot) in which data transmission is not performed.

At first, necessary code is newly set or modified (step S1). The code value is written in a memory for discontinuous transmission unit period 1 of a memory portion 14 (24). Namely, in the memory for discontinuous transmission unit period 1 of the memory portion, the code value to be set, per se, is stored.

Next, discontinuous code generation is turned OFF (step S2). The discontinuous code generation is a function for generating the necessary code by the shift register 31 for code generation only in the discontinuous transmission unit period to perform transmission of data and to terminate operation of the shift register for discontinuous transmission unit period where data transmission is not performed. Namely, here, the shift register 31 for code generation is operated constantly.

Next, the code value set at step S1 is set in the shift register 31 for code generation (step S3). Then, by shifting operation of the shift register 31 for code generation, necessary code is generated (step S4).

During data transmission, a discontinuous transmission unit period counter (not shown) of the timing generating portion 12 is operated constantly. For a memory interface 33 in the code generating portion 13 (23), a discontinuous transmission unit period timing signal and a discontinuous transmission unit period number signal are output constantly (step S5).

The memory interface 33 makes judgment whether a current timing is a termination timing of the discontinuous transmission unit period by the discontinuous transmission unit period timing signal from the timing generating portion 12 (22) (step S6). As a result, if the current timing is the termination timing of the discontinuous transmission unit period, a process is advanced to step S7. If the current timing is not the termination timing of the discontinuous transmission unit period, the process is returned to step S4 to continue code generation. It should be noted that even when the process is advanced to step S7 and subsequent steps, code generation is continuously performed.

At the termination timing of the discontinuous transmission unit period, the value of the shift register 31 for code generation is written in the memory portion 14 (24) (step S7). The memory to be written the value of the shift register for code generation is determined on the basis of the value of the discontinuous transmission unit period number from the timing generating portion 12 (22).

When writing in the memory at termination timing of each discontinuous transmission unit period (discontinuous transmission unit period 1 ends, discontinuous transmission unit period 2 ends, . . . discontinuous transmission unit period n−1 ends) except for the final discontinuous transmission unit period in the code period are completed (step S8), the process is advanced to step S9, and otherwise, the process is returned to step S4 to continue code generation (the termination timing of the final discontinuous transmission unit period is not necessary to be written in the memory.

The value of the shift register 31 for code generation at the leading end of the discontinuous transmission unit period 1 is reset to the code value per se set at step S1). Then, discontinuous code generation is turned ON (step S9) to generate necessary code by shifting operation of the shift register 31 for code generation (step S10). This operation is the same as the step S4 and is continued even during steps S5 to S9.

The memory interface 33 makes judgment whether the current timing is the termination timing of the discontinuous transmission unit period by the discontinuous transmission unit period timing signal from the timing generating portion 12 (22) (step S11). As a result, if the current timing is the termination timing of the discontinuous transmission unit period, the process is advanced to step S12. If the current timing is not the termination timing of the discontinuous transmission unit period, the process is returned to step S10 to continue code generation.

By the discontinuous transmission unit period number signal from the timing generating portion 12 (22), the memory interface 33 makes judgment whether the next discontinuous transmission unit period is the discontinuous transmission unit period to perform data transmission (step S12). As a result, when the next discontinuous transmission unit period is the discontinuous transmission unit period to perform data transmission, the process is advanced to step S13. If the next discontinuous transmission unit period is the discontinuous transmission unit period not to perform data transmission, the process is advanced to step S14.

In case of discontinuous transmission unit period to perform data transmission, the memory interface 33 reads out the value of the shift register upon termination of the discontinuous transmission unit period written in the memory portion 14 (44) at step S7 to set in the shift register 31 for code generation (step S13). The memory to be read out is determined on the basis of the value of the discontinuous transmission unit period number from the timing generating portion 12(22). When a bit value is set in the shift register 31 for code generation, the process is returned to step S10 to continue code generation.

At step S12, when the discontinuous transmission unit period is not the discontinuous transmission unit period to perform data transmission, the shift register 31 for code generation terminates shifting operation, namely terminates code generation (step S14). The memory interface 33 makes judgment whether the current timing is the termination timing of the discontinuous transmission unit period from the discontinuous transmission unit period timing signal from the timing generating portion 12(22) (step S15). As a result, when the current timing is the termination timing of the discontinuous transmission unit period, the process goes to step S12. If the current timing is not the termination timing of the discontinuous transmission unit period, the shift register 31 for code generation continues stopping of shifting operation (step S14).

It should be noted that the pattern of discontinuous transmission and reception (pattern of the physical channel of FIGS. 5 and 6) is a pattern in the case where the data to be transmitted is present in the mobile communication terminal in case of transmission, and the pattern from the transmitting base station is preliminarily notify to the mobile communication terminal, in case of reception. It should be noted that the pattern of the physical channel shown in FIGS. 5 and 6 is merely one example. In FIGS. 5 and 6, "T" and "R" on the phisical channel represent "Transmission" and "Reception", respectively.

Figure 7:
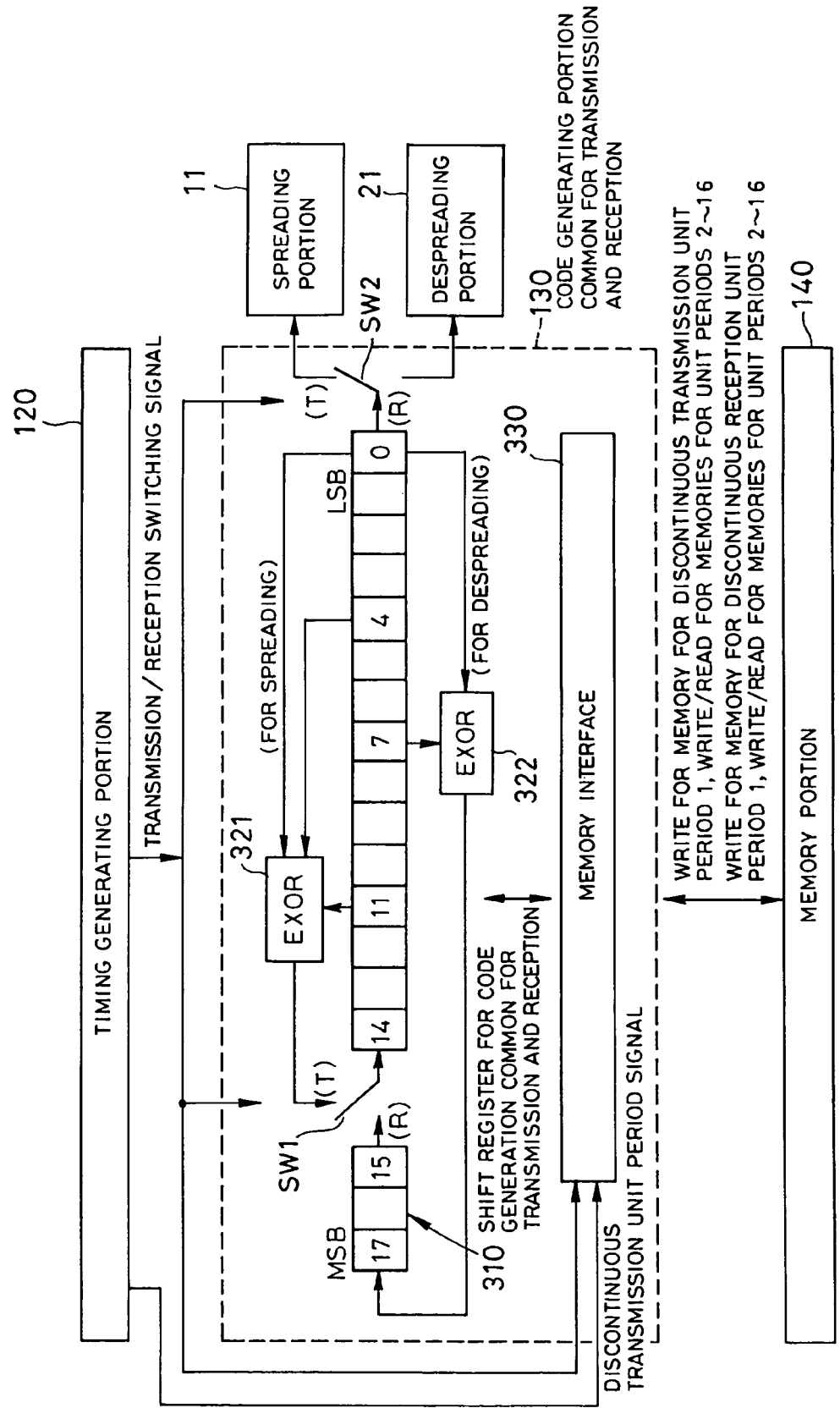
FIG. 7 is an illustration showing another embodiment of the present invention.
Figure 8A:
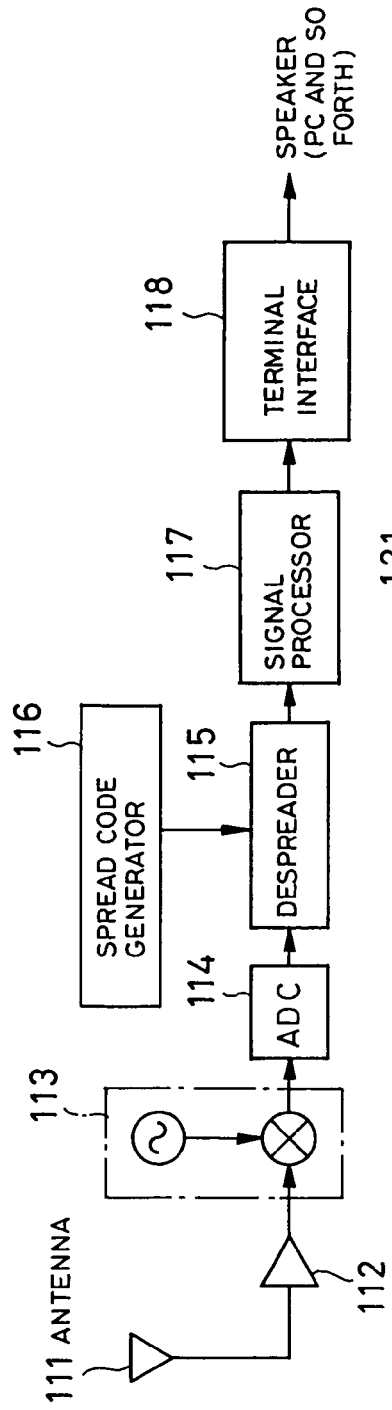
FIGS. 8(A) to 8(C) is an illustration showing a prior art.
Figure 8B:
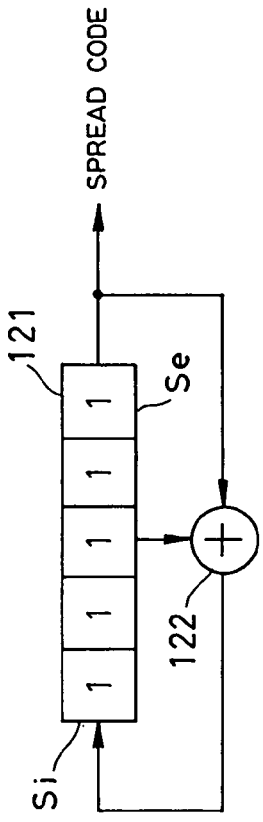
Figure 8C:
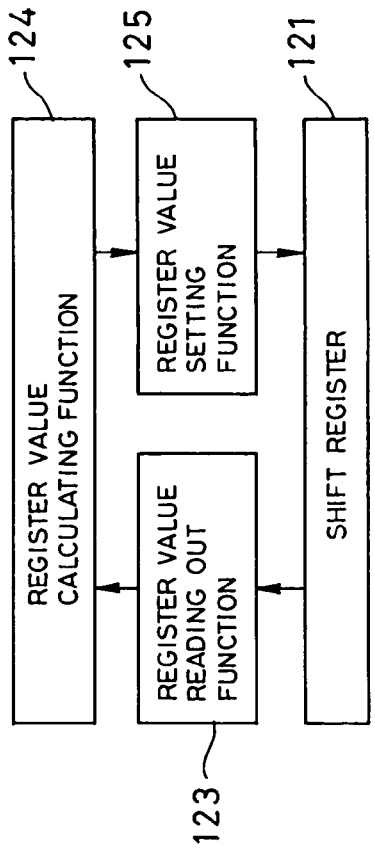

Assuming that transmission and reception are not performed simultaneously, as in TDD mode, in the present invention, the code generator for transmission and reception can be used in common. A construction in this case is shown in FIG. 7. In FIG. 7, the memory portion 140 has memory for discontinuous transmission unit period for transmission and memory for discontinuous transmission unit period for reception. In the shown case, the code generating portion 13 for transmission in FIG. 1 and the code generating portion 23 for reception in FIG. 2 are made common as shown in FIG. 7 to form a code generating portion common for transmission and reception portion 130. In the leading end of the discontinuous transmission unit period for performing transmission, a shift register value for the corresponding discontinuous transmission unit period for transmission is read out from the memory portion 140. The shift register value is then set in the shift register 310 common for transmission and reception to generate the code necessary for transmission.

In the discontinuous transmission unit period for reception, in order to certainly stop transmitting operation, the shift register value for the corresponding discontinuous transmission unit period for reception is read out from the memory portion 140 at the leading time of the discontinuous transmission unit period for reception to set in the shift register 310 for code generation common for transmission and reception to generate the code necessary for reception. The timing generating portion 120 generates transmission/reception switching signal (with taking the discontinuous transmission unit period as unit) is generate in addition to the timing signal necessary for generation of the code.

In the shown embodiment, no problem will be arisen when the code generators for transmission code and reception code have the same shift register construction (the same bit number construction). However, when the constructions of the code generators are different from each other, a construction shown in FIG. 7 has to be taken. The construction will be discussed with reference to FIG. 7. The shift register 310 for code generation common for transmission and reception generates the code necessary for transmission or reception according to the transmission/reception switching signal from the timing generating portion 120 to output to the spreading portion 11 or despreading portion 21. Bit number of the shift register is determined adapting to the greater bit number among those for transmission and reception. In FIG. 7, the shift register for transmission is 15 bits and the shift register for reception is 18 bits which are shown in simplified form. The construction of the shift register to be practically used are more complicate and is different in bit number or tap position.

The memory interface 330 reads out the shift register value from the memory portion 140 according to transmission/reception switching signal from the timing generating portion 120 and an appropriate timing, to set in the shift register 310 for generation of code common for transmission and reception. On the other hand, the value of the shift register 310 for generating the code common for transmission and reception are read out according to the transmission/reception switching signal from the timing generating portion 120 and an appropriate timing, to write in the memory portion 140.

The despreading portion 21 is to perform a process of the reception data with the code, such as despreading or the like. On the other hand, the timing generating portion 120 generates a timing signal necessary for the process with the code or code generation and the transmission/reception switching signal (taking the discontinuous transmission unit period as unit). The code generating portion 130 common for transmission and reception has the shift register 310 for code generation common for transmission and reception and the memory interface 330.

The memory portion 140 has memory for discontinuous transmission unit period for transmission and memory for discontinuous transmission unit period for reception for storing value of the shift register 310 for code generation common for transmission and reception at a timing of the leading end of each discontinuous transmission unit period. The bit number corresponds to bit number of the shift register for code generation. The spreading portion 11 performs process of the transmission data with the code, such as spreading process, scrambling process and so forth.

With the present invention, in the transmitting portion and receiving portion of CDMA system, upon performing data transmission discontinuous in time, such as TDD mode, DTX control, packet transmission or the like, code generating operation is interrupted in a time zone, in which code is not used for transmission and reception, current consumption can be reduced.

Particularly, in the present invention, by storing the value of the register upon interruption of operation of the shift register for code generation, the stored value is read out from the memory upon resumption of operation to set in the register. Therefore, the measuring function for measuring the operation interrupted period while the register operation is interrupted and calculating function for updating of the register condition depending upon the operation interrupted period as required in Japanese Unexamined Patent Publication No. Heisei 10-336749 set forth above, become unnecessary. Also, the function for generating the code can be substantially interrupted. Therefore, power consumption can be reduced.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A mobile communication terminal device of CDMA system comprising:
    a transmission circuit comprising a first code generating circuit for generating a multi-bit code necessary for transmission, a first storing device for storing value of each bit of said first code generating circuit, and a first control device for writing value of each bit at an arbitrary first write timing of said first code generating circuit, and reading the value of each bit stored in said first storage device at an arbitrary first read timing to set to each corresponding bit of said first code generating circuit; and
    a reception circuit comprising a second code generating circuit for generating a multi-bit code necessary for reception, a second storing device for storing value of each bit of said code generating circuit, and a second control device for writing value of each bit at an arbitrary second write timing of said second code generating circuit, and reading the value of each bit stored in said second storage device at an arbitrary second read timing to set setting to each corresponding bit of said second code generating circuit,
    wherein said arbitrary first write timing, said arbitrary first read timing, said arbitrary second write timing and said arbitrary second read timing are based on discontinuous transmission within a code period,
    wherein said first and second code generating circuits are the same circuit that is common to said transmission circuit and said reception circuit.

2. A mobile communication terminal device of CDMA system comprising:
    a transmission circuit comprising a first code generating circuit for generating a multi-bit code necessary for transmission, a first storing device for storing value of each bit of said first code generating circuit, and a first control device for writing value of each bit at an arbitrary timing of said first code generating circuit, and reading the value of each bit stored in said firat storage device at an arbitrary timing to set to each corresponding bit of said first code generating circuit;
    a reception circuit comprising a second code generating circuit for generating a multi-bit code necessary for reception, a second storing device for storing value of each bit of said code generating circuit, and a second control device for writing value of each bit at an arbitrary timing of said second code generating circuit, and reading the value of each bit stored in said second storage device at an arbitrary timing to set setting to each corresponding bit of said second code generating circuit;
    a common shift register portion constituted of shift register having smaller bit number among registers forming respective code generating circuit of said transmission circuit and reception circuit;
    a remaining shift register portion constituted of remaining shift register having greater bit number among registers forming respective code generating circuit of said transmission circuit and reception circuit;
    exclusive OR circuit and shift register tap for transmission and reception for generating respective of said code necessary for transmission and reception;
    switching circuit for switching respective outputs of said exclusive OR circuit, an output of said common shift register portion and an output of remaining shift register portion depending upon transmission and reception,
    wherein said first and second code generating circuits are the same circuit that is common to said transmission circuit and said reception circuit.

3. A mobile communication terminal device in a CDMA system designed for interrupting transmitting operation in a discontinuous reception unit period in a discontinuous transmission, and for interrupting receiving operation in discontinuous transmission unit period, comprising:
    a common shift register portion constituted of shift register having smaller bit number among registers forming respective code generating circuit of a transmission circuit and reception circuit;
    a remaining shift register portion constituted of remaining shift register having greater bit number among registers forming respective code generating circuit of said transmission circuit and reception circuit;

exclusive OR circuit and shift register tap for transmission and reception for generating respective of said code necessary for transmission and reception;

switching circuit for switching respective outputs of said exclusive OR circuit, an output of said common shift register portion and an output of remaining shift register portion depending upon transmission and reception.

* * * * *